Jan. 6, 1970     G. C. HUGHES     3,488,685

SAFETY VALVE FOR REGULATORS

Filed Sept. 17, 1968

INVENTOR.
George C. Hughes
BY
Johnson and Kline
ATTORNEYS

United States Patent Office 3,488,685
Patented Jan. 6, 1970

3,488,685
SAFETY VALVE FOR REGULATORS
George C. Hughes, Anderson, Ind., assignor to Textron Inc., Providence, R.I., a corporation of Delaware
Filed Sept. 17, 1968, Ser. No. 760,325
Int. Cl. F16k *17/04, 31/365*
U.S. Cl. 137—116.5                    6 Claims

ABSTRACT OF THE DISCLOSURE

A tamperproof safety valve for gas pressure regulators in which the means for controlling the safety valve in response to abnormal pressure conditions in the regulator is enclosed within the regulator and operates independently of the location of the closure cap for the regulator spring housing which is secured to the cover.

---

Heretofore, safety valves for pressure regulators had a stem which engaged the closure cap or a stop carried thereby to open the safety valve when the diaphragm carrying the safety valve moved excessively under abnormal pressures in the regulator due to mulfunctioning thereof. This had the disadvantage that if the cap was inadvertently left off, was misadjusted or the stop carried by the cap was altered, the safety valve could be rendered inoperative for its intended purpose.

The present invention overcomes the prior disadvantages by a simple tamperproof construction which is independent of the closure cap for the regulator spring housing on the cover of the regulator. This is accomplished by a simple operating yoke enclosed within the regulator and carried by the safety valve and having laterally extending wings engageable with the undersurface of the cover for the regulator to open the safety valve upon abnormal movement of the regulator diaphragm and independently of the position of the cap for the regulator spring housing on the cover.

Other features and advantages of the invention will be apparent from the specification and claims when considered in connection with the accompanying drawings in which:

Figure 1:
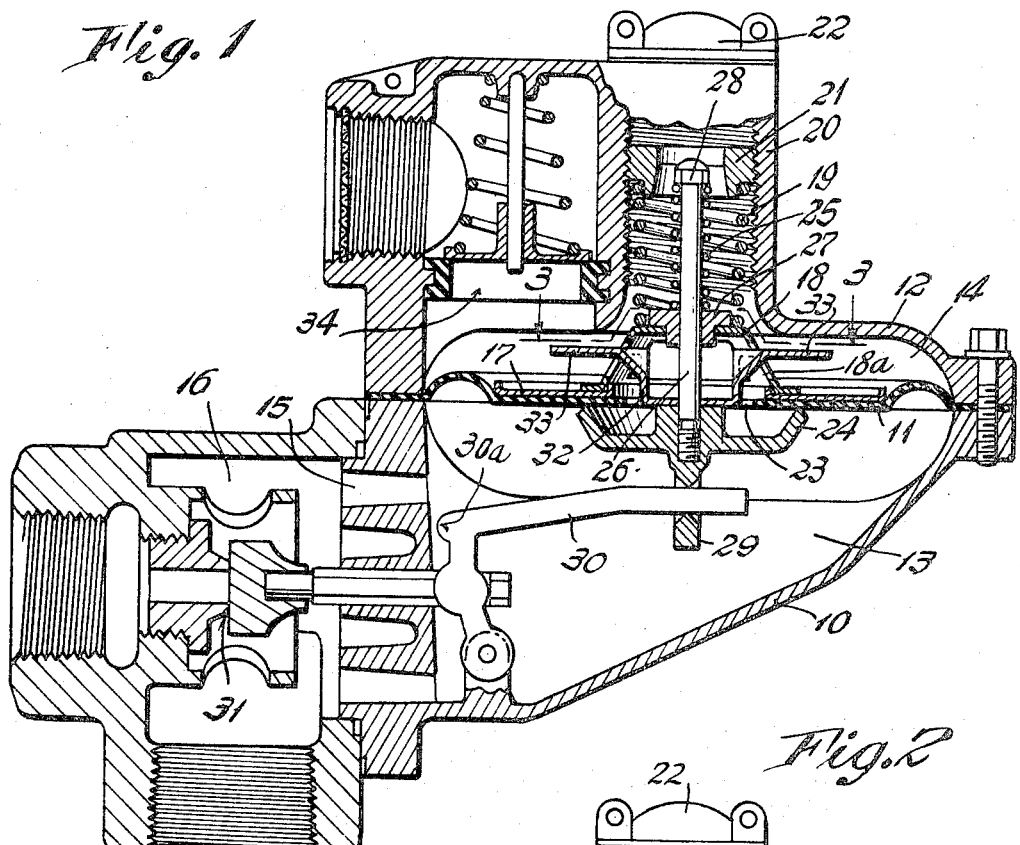
FIGURE 1 is a sectional view of the regulator.

As shown in the drawings, a housing 10 has a flexible diaphragm 11, preferably of synthetic material, extending across its upper end. The diaphragm is securely clamped in place by a cover 12 and forms a pressure chamber 13 and an atmospheric pressure chamber 14. The pressure chamber communicates through passages 15 with the outlet chamber 16.

The diaphragm is backed up by a metal plate 17 which carries the spring perch 18 which supports one end of the main regulator spring 19 extending upwardly into the regulator spring housing 20 carried by the cover 12. The upper end of the spring engages an adjustable abutment 21 threaded into the housing 20 and adjustable through the removable cap 22 for the housing 20 to provide the required counter pressure on the diaphragm.

The diaphragm has a central opening 23 which is normally closed by a safety valve head 24 urged to closed position by a spring 25 disposed around the valve stem 26. The spring has one end engaging a valve stem bearing 27 carried by the perch 18 and the other end engaging an abutment 28 on the valve stem 26. Normally, the safety valve moves with the diaphragm.

The safey valve has an apertured extension 29 which receives one end of a pivoted lever 30 connected to operate the inlet valve 31 in the outlet chamber in response to movement of the diaphragm under pressure in the pressure chamber.

Figure 2:
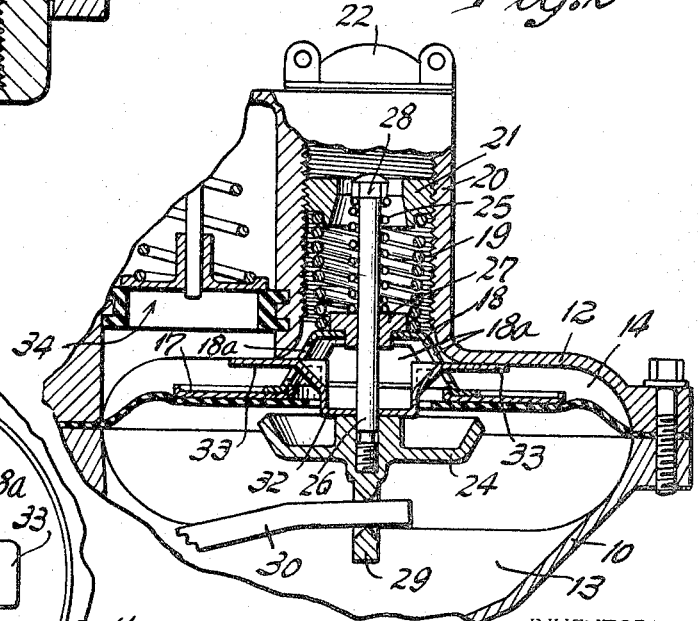
FIG. 2 is a fragmentary view similar to FIG. 1 showing the safety valve actuated.
Figure 3:
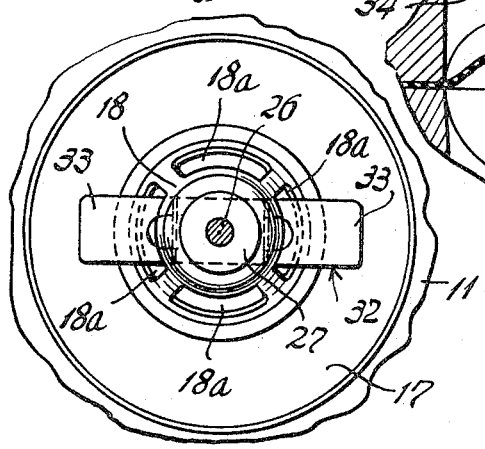
FIG. 3 is a view taken along line 3—3 of FIG. 1.

As shown in FIG. 3, the spring perch 18 has a plurality of apertures 18a and the valve stem 26 loosely carries a yoke 32, which is supported on the valve head, the yoke having wings 33 extending through the apertures 18a and laterally to a position to engage the undersurface of the cover 12 as shown in FIG. 2 to stop the safety valve when required. Preferably, the yoke applies the opening pressure directly to the valve head in response to abnormal movement of the diaphragm. It will be noted that the operation of the yoke is entirely independent of any closure for the regulator spring housing.

In operation, as the pressure in the pressure chamber increases, the diaphragm will move upwardly and rotate the link 30 about its pivot to close the inlet valve 31. Should the pressure continue to increase, the portion 30a of the lever will engage the housing and stop the movement of the lever. The stopped lever will cause the safety valve to remain stationary while the diaphragm continues to move upwardly opening the safety valve and permitting the excess pressure to be relieved through the central opening 23 and the openings 18a in the spring perch to the atmospheric pressure chamber and relief valve 34. In the event that the lever 30 is damaged or broken so that it cannot function to open the safety valve, continued movement of the diaphragm upwardly will cause the wings 33 on the yoke 32 to engage the undersurface of the cover and stop the movement of the safety valve while the diaphragm moves to the position shown in FIG. 2 and opens the safety valve. The pressure chamber is thus vented through opening 23 to the atmospheric pressure chamber 14 and to the atmosphere through the relief valve 34. This last operation is controlled by means which is entirely within the regulator and, therefore, tamperproof and is also entirely independent of the presence or position of the removable or adjustable closure cap for the spring housing.

I claim:

1. In a pressure regulator having a housing and a cover therefor and a diaphragm clamped therebetween and forming a pressure chamber and an atmospheric pressure chamber, said diaphragm having an opening therein, and a safety valve having a valve head normally yieldably closing said opening and being movable with the diaphragm in response to pressure variations in the pressure chamber, the improvement comprising means including laterally projecting portions carried by the safety valve to engage the undersurface of the cover upon abnormal movement of the diaphragm due to excess pressure in the pressure chamber and to thereafter prevent movement of the safety valve with the diaphragm to cause the safety valve to open the opening in the diaphragm and vent the pressure chamber.

2. The invention as defined in claim 1 wherein the last means comprises a yoke carried by the valve means, said yoke having laterally extending wings to engage the undersurface of the cover.

3. The invention as defined in claim 2 wherein the yoke engages the valve head and applies opening pressure directly thereto when the wings engage the cover.

4. The invention as defined in claim 2 wherein the yoke is loosely carried by a stem on the safety valve and engages the valve head to apply opening pressure directly thereto to open the safety valve to vent the pressure chamber of abnormal pressure.

5. The invention as defined in claim 2 wherein the yoke and wings are completely enclosed by the cover and are protected against external tampering.

6. The invention as defined in claim 1 wherein the cover has a pressure spring housing closed by a removable and adjustable cap and wherein the last means operates entirely independently of the presence or position of said cap.

References Cited

UNITED STATES PATENTS 3,160,169  12/1964  Peterson _____ 137—116.5 XR
3,221,762  12/1965  Chinn _____ 137—116.5

HAROLD W. WEAKLEY, Primary Examiner

U.S. Cl. X.R.

137—505.46